United States Patent [19]

Bukhshtab

[11] Patent Number: 5,331,391
[45] Date of Patent: Jul. 19, 1994

[54] METHOD OF DETERMINING THE OPTICAL LOSS IN REFLECTED RADIATION IN A FIBRE-OPTIC LIGHT GUIDE

[76] Inventor: Mikhail A. Bukhshtab, 2808 Mayfield Rd. #302, Cleveland Hts., Ohio 44118

[21] Appl. No.: 897,991
[22] Filed: Jun. 16, 1992
[51] Int. Cl.$^5$ ............................................. G01N 21/59
[52] U.S. Cl. ...................................................... 356/73.1
[58] Field of Search ........................................ 356/73.1

[56] References Cited

U.S. PATENT DOCUMENTS 5,037,197  8/1991  Bukhshtab et al. ................. 356/73.1

FOREIGN PATENT DOCUMENTS 59-12037  7/1982  Japan .
58-100733  12/1985  Japan .
2042165  9/1980  United Kingdom ............... 356/73.1

OTHER PUBLICATIONS

"Izmerenie malykh opticheskikh poter", 1988, Energatomizdat, (Leningrad), pp. 135–136.

Primary Examiner—Vincent P. McGraw

[57] ABSTRACT

A method of determining the optical loss in reflected radiation in a fibre-optic light guide under study, using an idle guide, comprises the steps of providing establishment of a stationary-mode distribution of radiation in forward and return paths thereof through the idle guide, introducing radiation from a source into the idle guide, measuring by a transducer of the power $P_0$ of radiation reflected by the output end face of the idle guide, mating of the output end face of the idle guide with the input end face of the guide under study to obtain the maximum power of the radiation which has entered the guide under study from the idle guide and has returned by the same path to the transducer after reflection from the output end face of the guide under study, measuring of the power $P_1$ of radiation reflected from the output end face of the guide under study, and finding, from the measured parameters, of the optical loss in the guide under study. Besides, if a high-quality mating of the end faces of the guides cannot be provided, the optical loss at the joint therebetween is determined from the measured values of powers $P_{01}$ and $P_{02}$ of the radiation which has entered the idle guide and has been scattered respectively in a first and a second points thereof located near the joint, and of powers $P_{11}$ and $P_{12}$ of the radiation which has entered the guide under study and has been scattered respectively in a first and a second points thereof, also located near the joint.

3 Claims, 2 Drawing Sheets

METHOD OF DETERMINING THE OPTICAL LOSS IN REFLECTED RADIATION IN A FIBRE-OPTIC LIGHT GUIDE

FIELD OF THE INVENTION

The invention relates to fibre optics and may be used to determine the total optical loss and the beam attenuation factor in different fibre-optic light guides.

BACKGROUND OF THE INVENTION

The accuracy of measurement of the optical loss in a light guide basically depends on the precision with which are measured the input and output losses of the guide. But in many practical cases the light guide allows access only to one of its ends: to the input. The optical loss at the output of the guide is then evaluated by the power of the radiation pulse scattered by the material of the guide, reflected by its end face and propagating in the return direction. In such cases an accurate measurement consists in determining the power of radiation introduced into the light guide.

Known in the art is a method of determining the optical loss in a light guide in reflected radiation, in which method from a radiation source a pulse is introduced into a splitter not connected to the guide to be investigated, the power of the pulse flowing through the splitter from the source to transducer is measured, the free end of the splitter is connected to the guide to be investigated and, with a proper time delay, follows a measurement of the power of the pulse which, being sent by the source through the splitter, has entered the guide and, reflected from the output end face of the guide, has come back by the same path in the guide to the transducer (JP, A, 59-12037). These measured quantities determine the optical loss in the guide. The power of the radiation pulse flowing through the splitter from the source to the transducer is measured in order to determine the radiating power introduced into the guide. When determining the optical loss in the guide, two rather weak signals are compared, with no need to measure the strong signal reflected from the free end of the splitter which might spoil the linearity of the transducer converting the power of this signal or even saturate the measuring system and, thereby, lead to its inefficiency, because the splitter is situated in a close proximity to the source and to the transducer.

However, in order to calculate, out of the power of the radiation pulse flowing through the splitter from source to transducer, the power of the radiation pulse introduced into the light guide under investigation, one must know all the optical characteristics of the splitter, whose measurement is in itself a complicated problem, whereas the inaccuracy of such a measurement would directly influence the accuracy of determination of the optical loss in the guide.

Known in the art is another method of measuring the optical loss in a light guide in reflected radiation on (JP, A, 58-100733), in which the free output end of a splitter is connected to a reflecting mirror, from a radiation source through a light guide simulator creating a stationary-mode distribution at the splitter input a pulse is introduced into the splitter, the power is measured in the radiation pulse reflected by the mirror at the output end of the splitter, the output end of the splitter is connected to the input end of the guide to be investigated, the output end of the guide is connected to said mirror and the power is measured in the radiation pulse which has entered the guide in question and, after reflection by the mirror, has followed the same path in its return to the transducer. The optical loss in the guide is evaluated from the relation between the powers measured. The use, at the output end of the splitter, of a high-reflecting mirror with a reflection factor near to unity allows to neglect parasitic reflections and the radiation flow inside the splitter, and thanks to it, to do without determining the optical characteristics of the splitter. But on the other hand, the use of mirrors leads to a high level of the compared powers, and this does not allow, at the same time and by one and the same instrument, to measure radiation reflected by the guide end face and radiation scattered by different sections of the guide, whereas such a simultaneous measuring is necessary if one analyses the distribution of optical parameters. This kind of analysis is used in the widely popular Optical Time Domain Reflectometry (OTDR).

Moreover, to realize such a method one must have access to both ends of the guide under study and this, as mentioned above, is not always possible. In addition, the use of mirrors complicates the introduction of such a method into practice.

Known is also a method of determining the optical loss in a fibre-optic guide in reflected radiation, which uses an idle light guide connected through a splitter with a source and a transducer of radiation and providing establishment of a stationary-mode distribution on the double (go and return) path in this guide, as well as excluding the non-linearity of conversion by said transducer of the power of the pulse reflected from the output end of the idle guide (M. A. Bukhshtab, "Izmerenie malykh opticheskikh poter", 1988, Energatomizdat (Leningrad), pp. 135–136). From the source a radiation pulse is introduced through the splitter into the idle light guide, and the transducer measures the $P_0$ of the radiation pulse reflected by the output end face of the idle guide. The output end face of the idle guide is mated with the input end face of the guide under study leaving between them such an air gap that the total pulse of the radiation reflected from the output end face of the idle guide and of the radiation reflected from the input end face of the guide under study may not be considerably broader than the pulse of radiation reflected from the output end face of the idle guide. The mating is accomplished by means of special adjustable devices or couplers. Measured are the power $P_{01}$ of the total radiation pulse reflected by the mated ends and the power $P_1$ of the radiation pulse which has entered the guide under study from the idle guide through the air gap and, after reflection from the output end face of the guide under study, has returned by the same path to the transducer. In order to measure said power a time delay is introduced into the measuring system of the transducer, delay which provides that the transducer responds only to the pulses of radiation reflected from the output end face of the guide under study. In the first place, the measured power values permit to evaluate the optical loss in the joint between two light guides, and after that, the optical loss in the guide under study.

The use of an idle guide allows, the measurement results in hand, to eliminate completely the influence of the splitter optical characteristics and, besides, to compare powers of radiation pulses whose level is much lower than in case when mirrors are used. On the other hand, the total radiation pulse reflected by the mated ends of the guides has a power which is approximately double of the power of a single radiation pulse reflected by the output end face of the idle guide, and this fact may result in a non-linear conversion by the transducer of this total pulse or in a saturation of the measuring system used and, thereby, make impossible the measurement itself. In order that the transducer provide a linear conversion of the total power $P_{01}$, one has to lower considerably the radiation power in the idle guide, but such a decrease will reduce the dynamic range of measurement of the optical loss in the guide under study. Furthermore, in this method it is the power of the radiation pulse reflected from the mated ends of light guides that is measured, while the power lost by the radiation when it passes the joint of two guides is determined by calculation which may bring systematic errors. This inaccuracy is due to the fact that the reflected signal maximum does not always coincide with the minimum loss in the joint, for example, when the end faces to be mated are parallel but the guides themselves are misaligned. Another drawback of the method is that the joint between the two guides, idle and subject to study, must always have an air gap, by which necessity the field of application of the method is limited. Otherwise, if said guides are mated without air gap, the total pulse of radiation reflected by the mated ends will disappear and measurements in reflected radiation by this method will become impossible.

SUMMARY OF THE INVENTION

The principal object of the present invention is to create a method providing a broader dynamic range of measurement of the optical loss in a light guide and a higher accuracy of this measurement.

Another important object of the invention is to provide a method enabling the measurement of optical loss in a light guide connected to an idle guide by a joint with an air gap or without an air gap.

One more object of the invention is to provide a possibility to measure the optical loss in a light guide with arbitrary connection to an idle guide.

With these principal objects in view, there is provided a method of determining the optical loss in a fibre-optic light guide in reflected radiation, using an idle light guide connected through a splitter to a source and to a transducer of radiation, providing establishment of a stationary-mode distribution on the double (go and return) path of this guide and excluding the non-linearity of conversion by said transducer of the power of the radiation pulse reflected by the output end face of the idle guide, wherein, according to the invention, the radiation from the source is introduced into the idle guide, the transducer measures the power $P_0$ of the radiation reflected by the output end face of the idle guide, the output end face of the idle guide is mated with the input end face of the guide under study so that the power of the radiation which has entered the guide under study from the idle guide and, after reflection from the output end face of the guide under study, has returned by the same path to the transducer should assume its maximum value, this maximum of the power $P_1$ is measured and from the measured values $P_0$ and $P_1$ the optical loss in the guide under study is evaluated.

If the output end face of the idle light guide is mated with the input end face of the light guide under study without an air gap, the optical loss in the guide under study is determined from the relation:

$$A = \frac{P_o - P_1}{2} + lg(n_1 - 1) +$$

$$lg(n_o + 1) - lg(n_1 + 1) - lg(n_o - 1), dBm$$

where
A is the optical loss in the guide under study, dBm,
$P_0$, the power of the radiation reflected by the output end face of the idle guide, dBm,
$P_1$, the maximum power of the radiation which has entered the guide under study from the idle guide and, after reflection from the output end face of the guide under study, has returned by the same path to the transducer, dBm,
$n_0$, the relative refractive index of the idle guide material,
$n_1$, the relative refractive index of the material of the guide under study.

If the output end face of the idle light guide is mated with the input end face of the light guide under study with an air gap, the optical loss in the guide under study is determined from the relation:

$$A = \frac{P_o - P_1}{2} + lg \frac{4n_o n_1}{(n_o + n_1)(n_o n_1 + 1)} +$$

$$lg \frac{(n_1 - 1)(n_o + 1)}{(n_1 + 1)(n_o - 1)}, dBm$$

where
A is the optical loss in the guide under study, dBm,
$P_0$, the power of the radiation reflected by the output end face of the idle guide, dBm,
$P_1$, the maximum power of the radiation which has entered the guide under study from the idle guide through the air gap and, after reflection from the output end face of the guide under study, has returned by the same path to the transducer, dBm,
$n_0$, the relative refractive index of the idle guide material,
$n_1$, the relative refractive index of the material of the guide under study.

In the proposed method a high accuracy of measurement of the optical loss in the light guide under study is achieved thanks to the high accuracy with which the optical loss at the joint between the output end of the idle guide and the input end of the guide under study is determined, because the optical loss at the joint is determined from the radiation which has entered through this joint into the guide under study and has returned by the same path, just as it is done when the aim is to measure the power of the radiation reflected by the output end face of the guide under study. The identity between the methods of loss measurement in cases of the radiation introduced into the guide under study and of extraction of the reflected radiation reduces to minimum the systematic errors of measurement.

The author has established by experiment that when two light guides, idle and subject to study, are of the same type, that is have equivalent core and sheath diameters, and when their ends are placed in identical thimbles or identically shaped, a precise adjustment of the end faces mated by the maximum power of the radiation reflected by the output end face of the guide under study allows to mate the end faces of both guides, idle and subject to study, with such an accuracy that, when they are joined without an air gap by fusion or glueing together, the optical loss due to the double (go and return) crossing of the joint may be, without decrease in accuracy of measurement, considered equal to zero, and when they are joined with an air gap, the optical loss may be calculated from the relations obtained by the author and presented here, taking into account the refractive indexes of materials of both guides, idle and subject to study. In this case when the light guides are mated without an air gap the loss in the guide under study must be determined from the relation between powers of radiation reflected by the output end faces of the idle guide and of the guide under study taking into account, as before, that the refractive indexes of these guides are different, and only when these indexes are the same, the loss is determined exclusively by the relation between powers.

The fact that the both guides, idle and subject to study, are mated with an accuracy adjustable so as to obtain the maximum power of the radiation reflected by the output end face of the guide under study, allows, in contrast to the known methods of adjusting the accuracy of mating at the maximum power of the radiation passing through the joint or by the geometric coincidence of the light guides, to take into account the difference between optical losses due to the radiation passing through the joint of two guides in forward and return directions, to obtain that they attain their minimum simultaneously and to reduce them either to zero or to a double value calculated by the proposed relations. In consequence there is no need to measure the power of the radiation pulse reflected by the mated end faces of the idle guide and of the guide under study and therefore, the dynamic range of measurement of the optical loss in the light guide is extended, the accuracy of this measurement is increased. A higher accuracy is caused by elimination of the possibility of systematic errors due to the nonequivalence of reflection and of passing by the radiation through the joint between the light guides.

Whether an air gap is or is not provided between the end faces of the guides to be mated depends on the operating conditions, on the availability of one or another equipment, etc. If the user has an equipment for machining the end faces and for the fusion of light guides to be connected, for example, into a communication line, they are, as a rule, connected without an air gap. If the end faces of the guides are machined or terminated by standard thimbles and only determination of loss is required, or if the joint must be detachable, then as a rule the light guides are connected with an air gap.

If the work is carried out under field conditions where, for example, a line is formed by connection of different light guides, often with different geometric and optical parameters, and one must determine beforehand the loss in each guide in order to evaluate its fitness for the wiring, and where dust or foreign inclusions may get into the fused or detachable joint, it is necessary, irrespective of the method of connection, to measure directly the optical loss of the radiation passing through the joint in forward and return directions. In this case the beforesaid objects of the invention are achieved by the fact that the method of determining the optical loss in a fibre-optic light guide in reflected radiation with the aid of an idle guide connected through a splitter to a radiation source and a transducer, providing establishment of a stationary-mode distribution on the double (go and return) path through this guide, and excluding non-linearity in the conversion by the transducer of the power of radiation pulse reflected by the output end face of the idle guide, consists in that the radiation is introduced from the source into said idle guide, the transducer measures the power $P_o$ of the radiation reflected by the output end face of the idle guide, the output end face of the idle guide is mated with the input end face of the guide under study so that the radiation from the idle guide passes into the guide under study and back into the idle guide, the power $P_1$ of the radiation which from the idle guide has entered the guide under study and, after reflection from the output end face of the guide under study, has returned by the same path to the transducer, is measured, then are measured the powers $P_{o1}$ and $P_{o2}$ of the radiation which has entered the idle guide and, scattered in the first and the second points of the idle guide, has returned by the same path to the transducer, said first and second points being located at the distances $l_{o1}$ and $l_{o2}$, accordingly, from the radiation source, on which distances a stationary-mode distribution is established when the radiation passes from the source to these points and back to the transducer, then are measured the power $P_{11}$ and $P_{12}$ of the radiation which has entered the guide under study and, scattered in the first and the second points of the guide under study, located at the distances $l_{11}$ and $l_{12}$, accordingly, from the radiation source, and the optical loss in said guide is determined by the following relation:

$$A = \frac{P_o - P_1}{2} + P_{o2} - P_{11} - \frac{P_{o1} - P_{o2}}{l_{o2} - l_{o1}} \times$$

$$(l - l_{o2}) - \frac{P_{11} - P_{12}}{l_{12} - l_{11}} (l_{11} - l)^2, \text{dBm}$$

where

A is the optical loss in the guide under study, dBm, $P_o$, the power of the radiation reflected by the output end face of the idle guide, dBm, $P_1$, the power of the radiation which has entered the guide under study from the idle guide and, after reflection from the output end face of the guide under study, has returned by the same path to the radiation transducer, dBm, $P_{o1}$, the power of the radiation introduced into the idle guide and scattered in the first point of this guide, dBm, $P_{o2}$, the power of the radiation introduced into the idle guide and scattered in the second point of this guide, dBm, $P_{11}$, the power of the radiation introduced into the guide under study and scattered in the first point of the guide under study, dBm, $P_{12}$, the power of the radiation introduced into the guide under study and scattered in the second point of the guide under study, dBm, $l_{o1}$, the distance from the radiation source to the first point of the idle guide, m, $l_{o2}$, the distance from the radiation source to the second point of the idle guide, m, $l_{11}$, the distance from the radiation source to the first point of the guide under study, m, $l_{12}$, the distance from the radiation source to the second point of the guide under study, m, l, the distance from the radiation source to the output end face of the idle guide, m.

It has been discovered by experiment that, when the ends of nonequivalent light guides are joined, that is when the guide cores and sheaths have different diameters, or when the guide ends are terminated by thimbles and connectors of different types, or when it is impossible to fuse or glue the end faces of the guides so as to obtain a high quality of the joint, a measurement of optical loss in the joint by the radiation introduced into the guide under study and the radiation scattered and passing through the same joint in the return direction allows, without a systematic error, to eliminate the loss due to the introduction into and to the extraction from the guide under study of the radiation reflected from its output end face. A measurement of the scattered radiation in two points of the idle light guide and in two points of the guide under study located, accordingly, before and after the joint permits to take into account the total optical loss due to the radiation crossing the joint in forward and return directions thanks to the measurement of this loss in the radiation which has passed through the joint and, scattered by the points of the guide under study, has returned by the same path in backward direction. It is no more necessary to measure the power of the radiation pulse reflected by the joint. In consequence, as in the previous mode of putting the method into practice, the dynamic range of measurement of optical loss in a light guide is extended and the accuracy of this measurement is increased.

The objects of the invention, above mentioned and others, as well as the advantages of the present invention will become more obvious from the following detailed description of preferable examples of its realization, with reference to the accompanying drawings.

DESCRIPTION OF THE PREFERRED EMBODIMENTS

The device for the realization of the proposed method of determining the optical loss in fibre-optic light guides in reflected radiation comprises a radiation source 1 (FIG. 1), a splitter 2 and a radiation transducer 3. The radiation source 1 and transducer 3 are, through the splitter 2, connected to an idle light guide 4 providing establishment of a stationary-mode distribution of the radiation on the double (go and return) path through this guide and excluding non-linearity in the conversion by the transducer 3 of the power of radiation reflected by the output end face 4a of the idle guide 4. These properties of the idle guide 4 are achieved by known methods, for example, by selection of its length or by introduction of proper forced bendings of this idle guide 4, bendings that divert a part of radiation outside. The function of a device for the realization of the proposed method may be performed by any known optical time domain reflectometer (OTDR) with a time delay.

The method of determining the optical loss in a fibre-optic light guide according to the invention is realized as follows.

Figure 1:
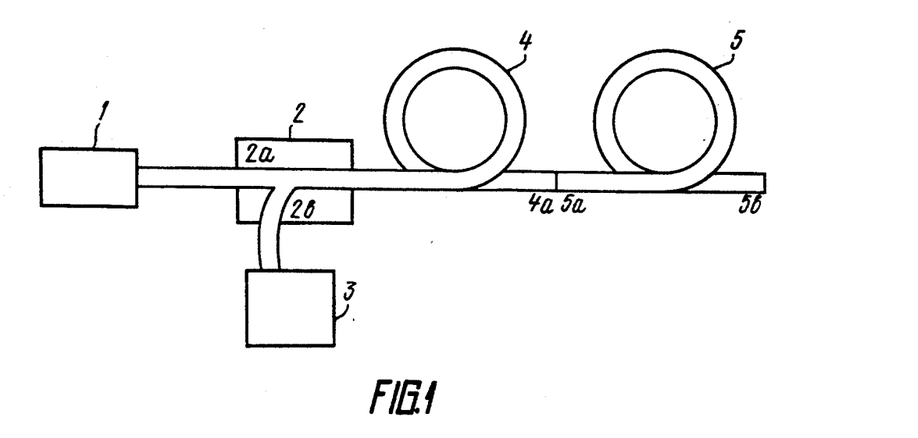
FIG. 1 represents a device for the realization of the method of determining the optical loss in a fibre-optic light guide in reflected radiation according to the invention; the guide under study is connected to the idle guide without an air gap.

Any type of radiation, pulsed, pulse-modulated or continuous, in which by any known method is cut out a time interval to be measured, is introduced from the source 1 through the splitter 2 into the idle light guide 4, and the transducer 3 measures the power $P_o$ of the radiation which has passed the first branch 2a of the splitter 2 and the idle guide 4, has been reflected by the output end face 4a of the idle guide 4, has repassed the idle guide 4 and has been diverted by the second branch 2b of the splitter 2 towards the transducer 3. In this case the power $P_o$ measured by the transducer 3 is equal to:

$$P_o = P_s - A_{2a} - A_o + lg\rho_o - A_o - A_{2b} = P_s - 2A_o - A_{2a} - A_{2b} + lg\rho_o, \text{dBm} \quad (1)$$

where
  $P_o$ is the power of the radiation reflected by the output end face 4a of the idle light guide 4, dBm,
  $P_s$, the power of radiation of the source 1, dBm,
  $A_o$, the optical loss in the idle guide 4, dBm,
  $A_{2a}$, the optical loss in the branch 2a of the splitter 2, dBm,
  $A_{2b}$, the optical loss in the branch 2b of the splitter 2, dBm,
  $\rho_o$, the reflection factor of the output end face 4a of the idle guide 4:

$$\rho_o = [(n_o - 1)/(n_o + 1)]^2,$$

where
  $n_o$ is the relative refractive index of the material of the idle guide 4.

Figure 2:
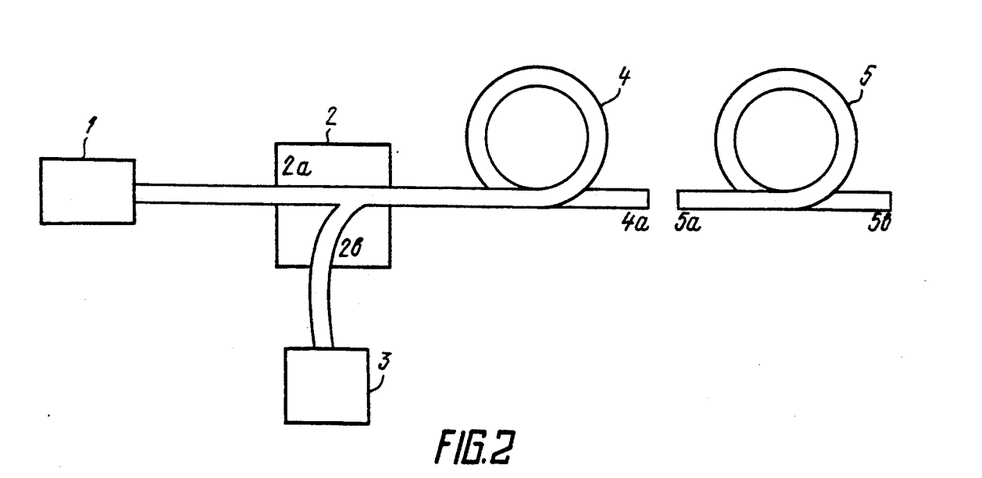
FIG. 2 shows the device of FIG. 1 in which the guide under study is connected to the idle guide with an air gap.

The output end face 4a of the idle guide 4 is mated with the input end face 5a of the light guide 5 under study. For this purpose traditional devices are used: precision tables, connectors or welding units. Depending on requirements for the method of connection of the light guides, they may be connected without an air gap (FIG. 1) as well as with an air gap (FIG. 2).

In order to realize the first version of the method of determining the optical loss in the guide 5 under study, the guides are joined, for example, with subsequent fusion, and therefore requirements common for the fusion are applied to the ends 4a and 5a to be joined: the guides must have equivalent geometry, that is identical internal and external diameters, and have equivalent optical properties: both guides must be of the same type, with stepped or graded refractive index, monomode, etc., the end faces of the guides must be identically and carefully worked (chipped) as it is usually done before the fusion.

The preliminary mating is achieved by a method, provided in the fusing device, with visual inspection. The optimal mating and fusion for a connection without an air gap is realized so as to obtain the maximum power $P_1$ of the radiation which enters the guide 5 under study from the idle guide 4 and, after reflection from the output end face 5b of the guide 5 under study, returns into the idle guide 4 passing through the same joint, attains the transducer 3 and is measured there.

In order to measure the maximum of the power $PH_1$ of the radiation reflected by the output end face 5b, the signal measuring system (not shown) of the transducer 3 is adjusted, by a routine method, with a time delay which provides that the transducer 3 responds only to pulses or pulse bursts (depending on the type of modulation adopted in the system used) of the radiation reflected by the output end face 5b of the guide 5 under study. Owing to the fact that the optimal mating and subsequent connection without an air gap are obtained at the maximum power of reflected radiation, the proposed method provides a minimum, substantially equal to zero, total optical loss due to the passing through the joint in forward and return directions. The obtained maximum power $P_1$ of the radiation reflected by the end face 5b is measured by the transducer 3. When the light guides are connected without an air gap, as it is shown in FIG. 1, this power is equal to:

$$P_1 = P_s - A_{2a} - A_o - A + lg\rho_1 - A - A_o - A_{2b} = P_s - 2A_o - A_{2a} - A_{2b} - 2A + lg\rho_1, \quad (2)$$

where $P_1$ is the maximum value of power of the radiation which has entered the guide 5 under study from the idle guide 4 and, after reflection from the output end face 5b of the guide 5 under study, has returned by the same path to the transducer 3, dBm, $P_s$, the power of the radiation emitted by the source 1, dBm, A, the optical loss in the guide 5 under study dBm, $A_o$, the optical loss in the idle guide 4, dBm, $A_{2a}$, the optical loss in the branch 2b of the splitter 2, dBm, $A_{2b}$, the optical loss in the branch 2b of the splitter 2, dBm, $\rho_1$, the reflection factor of the output end face 5b of the guide 5 under study:

$$\rho_1 = [(n_1 - 1)/(n_1 + 1)]^2,$$

where $n_1$ is the relative refractive index of the material of the guide 5 under study.

From the expressions (1) and (2) it follows that $$A = \frac{P_o - P_1}{2} + \frac{1}{2} lg\rho_1 - \frac{1}{2} lg\rho_o = \frac{P_o - P_1}{2} + \quad (3)$$

$$lg(n_1 - 1) + lg(n_o + 1) - lg(n_1 + 1) - lg(n_o - 1), \text{dBm},$$

From the relation (3) it follows that when $\rho_1 = \rho_o$, the optical loss in the light guide under study is determined only by the difference between the powers $P_1$ and $P_o$:

$$A = 0.5(P_o - P_1), \text{dBm} \quad (4)$$

In cases when it is necessary to provide a detachability of the connected ends of the guides, subject to study and idle, a second version of the proposed method is realized, shown in FIG. 2. To carry out the measurement according to this version of the proposed method, the end faces of the guides are worked as in the first version, then the output end 4a of the idle guide 4 and the input end 5a of the guide 5 under study are brought into proximity, by a mechanism comprised in the OTDR or in the welding unit, after that a preliminary mating is done, for example, with visual inspection: the end faces to be mated, 4a and 5a, are parallelized and the guides themselves are aligned, but with all this, the ends 4a and 5a are not fused, and the air gap between them is not reduced to zero. If the ends of the guides, idle and subject to study, are terminated by thimbles of the same type, a standard connector providing detachability is used to join the ends 4a and 5a.

When the preliminary mating is finished measured is the power $P_1$ of the radiation which has entered through the joint into the guide 5 under study, has been reflected by its output end face 5b, has returned through the joint in its reverse propagation into the idle guide 4, and further has got into the transducer 3. At the same time, while measuring this reflected radiation, its maximum value $P_1$ is achieved by fine adjustment of the accuracy of mating. When the mating is done with the aid of connectors, the end faces 4a and 5a are either remated several times to make sure the value $P_1$ is at its maximum, or in a proper known way, readjusted by tightening or easing off the connector, according to its type. In this operation the optimum of the air gap length is also determined by the maximum value of $P_1$ because it can be obtained, moving apart the guides, that no part of radiation would any more pass from the idle guide into the guide under study and back, the criterion of this phenomenon being the maximum of the value $P_1$. The fact that the air gap in itself is present is checked visually in the case of mating nonterminated guides, and for the terminated guides the air gap is provided by the arrangement of the connector itself, in order to prevent the chipping-off of the end faces to be mated.

The power $P_1$ monitored by the transducer 3 will in this case be equal to:

$$P_1 = P_3 - A_{2s} - A_o - A_c - A + lg\rho_1 - A - A_c - \quad (5)$$

$$A_o - A_{2b} = P - A_{2a} - A_{2b} - 2A_o - 2A_c - 2A + lg\rho_1, \text{dBm}$$

where $A_c$ is the optical loss in the air gap between the output end face 4a of the idle guide 4 and the input end face 5a of the guide 5 under study, dBm, $P_1$, the maximum value of the power of the radiation which has entered the guide 5 under study through the air gap from the idle guide 4 and, after reflection from the output end face 5b of the guide 5 under study, has returned by the same path to the transducer 3, dBm, $P_s$, the power of the radiation emitted by the source 1, dBm, $A_1$, the optical loss in the guide 5 under study, dBm, $A_o$, the optical loss in the idle guide 4, dBm, $A_{2a}$, the optical loss in the branch 2a of the splitter 2, dBm, $A_{2b}$, the optical loss in the branch 2b of the splitter 2, dBm, $\rho_1$, the reflection factor of the output end face 5b of the guide 5 under study:

$$\rho_1 = [(n_1 - 1)/(n_1 + 1)]^2,$$

where $n_1$ is the relative refractive index of the material of the guide 5 under study.

From the expressions (1) and (4) it follows that $$A = \frac{P_o - P_1}{2} + \frac{1}{2} lg\rho_1 - \frac{1}{2} lg\rho_o - A_c, \text{dBm} \quad (6)$$

To transform the expression (5) into an expression containing known values represented by the relative refractive indexes of materials of the guides 4 and 5, let the expression for $A_c$ take the form of transmission factors of two boundaries separating the idle guide 4 and the guide 5 under study, with an air gap between these two boundaries, and then, taking into account multiple reflections:

$$A_c = -lg \frac{(1-\rho_0)(1+\rho_1)}{1-\rho_0\rho_1}, \text{dBm} \qquad (7)$$

where
$\rho_0$ is the reflection factor of the output end face 4a of the idle guide 4,
$\rho_1$, the reflection factor of the output end face 5b of the guide 5 under study,
$\rho_0\rho_1$, the factor of multiple reflections.

Since the reflection factors $\rho$ are related with the refractive indexes n by the expression $$\rho = [(n-1)/(n+1)]^2,$$

the relation (7), after transformation, yields:

$$A_c = -lg\frac{[1-(n_0-1)^2/(n_0+1)^2][1-(n-1)^2/(n+1)^2]}{1-[(n_0-1)(n-1)]^2/[(n_0+1)(n-1)]^2} = \qquad (8)$$

$$-lg\frac{4n_0n}{(n^0+n)(n^0n+1)}, \text{dBm}$$

Taking into account the relation (7), the transformation of the expression (6) yields:

$$A = \frac{P_0 - P_1}{2} + lg\frac{4n_0n_1}{(n_0+n_1)(n_0n_1+1)} + \qquad (9)$$

$$lg\frac{(n_1-1)(n_0+1)}{(n_1+1)(n_0-1)}, \text{dBm},$$

In case of identity of relative refractive indexes of the materials of the idle guide 4 and of the guide 5 under study the optical loss in the guide 5 under study is determined by the relation:

$$A = \frac{P_0 - P_1}{2} + lg\frac{2n}{n^2+1}, \text{dBm} \qquad (10)$$

Thanks to the fact that when the proposed method of measurement is used, the input end face 5a of the guide 5 under study is mated with the output end face 4a of the idle guide 4 so as to obtain the maximum value of power of the radiation reflected by the output end face 5b of the guide 5 under study, the foreign, uncontrollable part is not contained in the loss due to the passing through the joint in forward and return directions, or this may be taken into account according to the expressions (3) and (9). As a result, there is no more necessity to measure the power of the radiation reflected by the joint of the end faces 4a, 5a of the idle guide 4 and of the guide 5 under study, and consequently, the dynamic range of the measurement of the optical loss in the guide 5 is extended and the accuracy of this measurement is increased.

Figure 3:
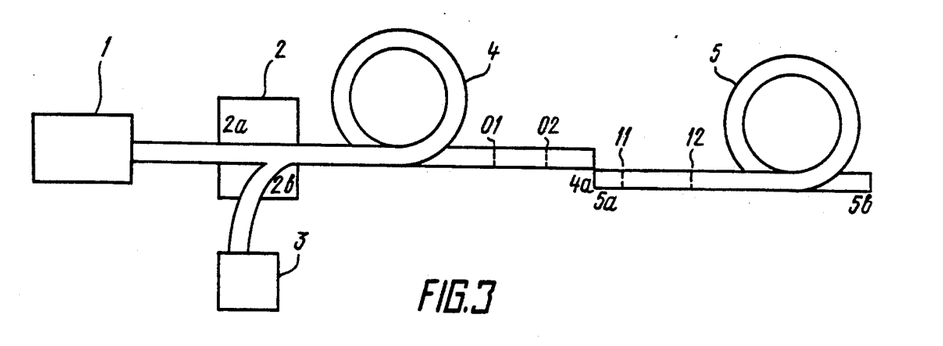
FIG. 3 shows the device of FIG. 1; an unspecified joint between the two guides, idle and subject to study.

In cases when the end face 4a of the idle guide 4 and the end face 5a of the guide 5 under study are not equivalent, that is differ by their core and sheath diameters, or are terminated by different thimbles, or when their fusion or detachable connection is realized under field conditions and there is no certainty that the joint does not contain dust, mud or other foreign inclusions which spoil the quality of mating as shown in FIG. 3, the method of determining the optical loss in the guide 5 under study is realized as follows.

As in the preceding versions of implementation of the proposed method, before the mating of the guides, the idle guide 4 and the guide 5 subject to study, the power $P_O$ is measured which characterizes the radiation pulse that has passed the first branch 2a of the splitter 2, the idle guide 4, has been reflected by the output end face 4a of the idle guide 4, has repassed the idle guide 4 and has been diverted by the second branch 2b of the splitter 2 towards the transducer 3. The output end face 4a of the idle guide 4 is mated with the input end face 5a of the guide 5 under study so that the radiation from the idle guide 4 may pass into the guide 5 under study and in opposite direction. This condition is realized by means of known mating devices (not shown) which are available and are capable to provide introduction into the guide 5 under study from the idle guide 4 and extraction from the guide 5 under study into the idle guide 4 at least of a part of the radiation emitted by the source 1, as well as a possibility, for a part of the radiation reflected by the output end face 5b, to reach the transducer 3. And here it is not necessary that such a mating device provide a possibility to adjust the quality of mating. With the aid of the time delay system similar to the preceding versions of the method, is measured the power $P_1$ of the radiation which has entered the guide 5 under study from the idle guide 4 and, after reflection from the output end face 5b of the guide 5 under study, has returned by the same path into the idle guide 4, the splitter 2 and the transducer 3. Here is determined the value of the power $P_1$ measured by the transducer 3, as in the preceding version, by the expression (5), but in this case the quantity $A_c$ is the loss in the joint the state of which is not specified. In order to determine the loss $A_c$ due to the passing by the radiation through the joint in forward and return directions, behaviour of the curve of backward scattering before and after the joint (FIG. 4) is analysed, its variation at the joint characterizes the loss of radiation passing through the joint in forward and return directions. To determine this loss it suffices to measure the power of radiation scattered by four material points formed by four identical zones of small, if compared to the lengths of the idle guide 4 and of the guide 5 under study, length $\Delta l$. The length $\Delta l$ of these zones is preselected as the integration time proper to the measuring device used, applying a known ordinary method. From the moment of arrival of the radiation are determined the distances to these zones and to the joint.

Figure 4:
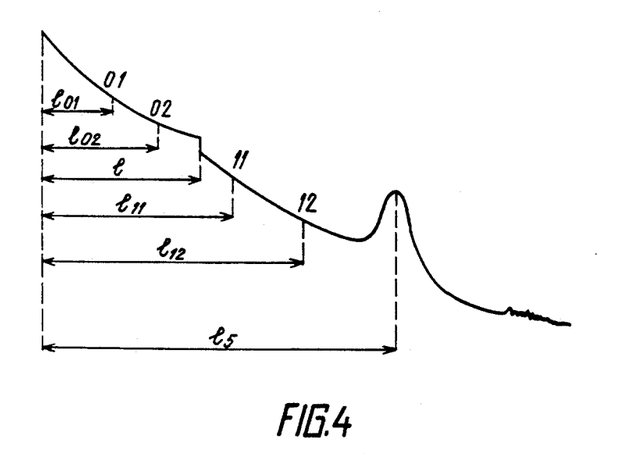
FIG. 4 shows the behaviour of a curve of backward scattering near the joint of an unspecified type according to FIG. 3.

The first two points 01 (FIG. 3) and 02 for measuring the powers $P_{01}$ and $P_{02}$ are selected in the idle guide 4 at distances $l_{01}$, $l_{02}$ from the source and near the joint, the two others (11 and 12) for measuring the powers $P_{11}$ and $P_{12}$, in the guide under study at distances $l_{11}$, $l_{12}$ from the source, also near the joint which is at a distance l from the source (FIG. 4). Said points (zones) are selected so as to take best advantage from resolution in space and accuracy of the measuring device used (not shown): the points should not be too near to the joint, so that one might distinguish pulses scattered from the pulse reflected by the joint which at the moment is not measured; besides, the points must be spaced so that the measuring device could with certitude distinguish the values of power of the radiation scattered at these points. The points 01 (FIG. 3), 02 and 11, 12 may also be farther away from the joint if the character of resolution of the radiation in the both guides is known and its invariability is not subject to any doubt, but then the points 01 and 02 of the idle guide 4 must have between them the distance of establishment of a stationary-mode distribution of the radiation in its path from the source 1 to these points and back to the transducer 3; in other words, in this version of the measurement method the stationary-mode distribution must set in the sections of the idle guide 4 where the radiation gets earlier than in the first two versions.

The loss $P_{01}-P_{02}$ measured between the points 01 and 02 of the idle guide 4 and related to the distance $l_{02}-l_{01}$ between them $$(P_{01}-P_0)/(l_{02}-l_{01})$$

expresses the loss per unit of length in the idle guide 4, in a similar way $$(P_{11}-P_{12})/(l_{12}-l_{11})$$

is the loss per unit of length in the guide 5 under study. In consequence, the difference between losses per unit of length, reduced to the joint from the right and from the left, determines the total loss of radiation passing through the joint between guides in forward and return directions, hence the loss in the guide 5 under study is determined by the expression:

$$A = \frac{P_o - P_1}{2} - P_{o2} - P_{11} - \frac{P_{o1} - P_{o2}}{l_{o2} - l_{o1}}(l - l_{o2}) - \qquad (11)$$

$$\frac{P_{11} - P_{12}}{l_{12} - l_{11}}(l_{11} - l), \text{dBm}$$

The accuracy of measurement of the optical loss using the expression (11) is increased owing to the fact that, irrespective of the precision of mating of the light guides, the measurement takes into account the real total value of loss of the radiation reflected by the output end face 5b of the guide 5 under study, due to the passing through its joint with the idle guide 4 in forward and return direction, by measuring the losses in a similar double passing of the joint by the radiation scattered by the points of the guide under study.

Figure 5:
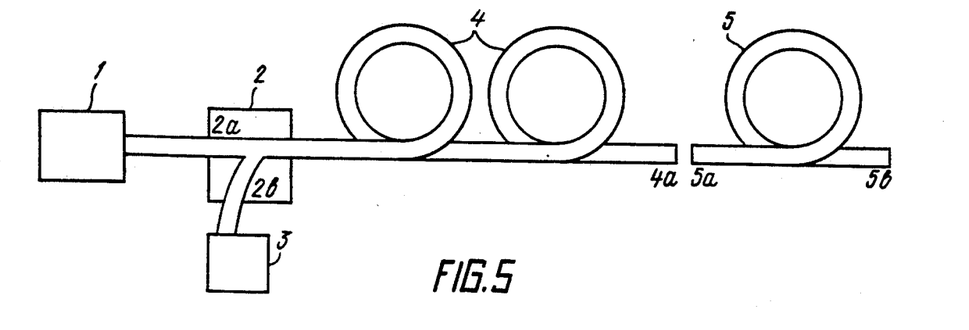
FIG. 5 shows an idle light guide in case of measurement of the optical loss in a distant guide under study mated with a line of light guides.

When it is necessary to investigate guides very distant from the source and the linear dynamic range of the measuring device used is not broad enough to measure linearly both the power reflected by the output end face of the idle guide and the power reflected by the output end face of the guide under study, the function of the idle guide may be performed by a compound guide whose output end is the output end of the guide preceding the guide under study (FIG. 5). Measurement operations remain the same and, according to the above-mentioned conditions, one or other of the three methods of measurement described here is used. Then the necessary linear dynamic range of the measurement device may be marrow enough, so as to obtain at the same time the highest possible sensitivity to the power of radiation reflected by the output end face of the guide under study.

All the above-described embodiments of the proposed method for measuring the optical loss in a guide to be investigated were checked by experiment with different types of fibre-optic reflectometers: reflectometer OP-5 (USSR), Ando-AQ1720 (Japan), Anritsu-MW98A (Japan). The essential part of the tests was executed with the OP-5 instrument in which an idle light guide was incorporated, 125 meters long. The dynamic range of measurement by this instrument of the powers of backward scattered signals was 6–8 dB for measurements by the known method, 10 dB for linear measurement of total reflection from the joined end faces of the guides and, for the proposed method, attained 20 dB with random errors of measurement of such values of the optical loss not higher than 0.5–0.7 dB. The comparison of the results of measurements according to the proposed method with those obtained by known methods of backward scattered radiation using fibre-optic reflectometers was carried out in an appreciably narrower range of sensitivity of reflectometers which was not broader than 15 dB. The discrepancy of the optical loss measured by the Ando-AQ1720 instrument in a light guide under study 2.36 km long on the wave length of 1.3 m and equal to 1.25 dB did not exceed 0.15 dB with the idle guide and the guide under study mated with an air gap. The discrepancy of results obtained by the Anritsu-MW98A instrument on light guides mated without an air gap, with an unspecified state of joint for the fused light guides of different types, with graded and with stepped refractive index, in two cases: by proposed method and by backward scattering, did not exceed 0.05–0.1 dB for the optical losses of 2.8 dB and 0.4 dB in fibreoptic cables 540 and 60 m long on the wave length of 0.85 m. The maximum length of fibre-optic cable measured with the OP-5 instrument by the proposed method was 6.7 km and the measured value of the optical loss on the wave length of 0.85 m was 15.5±0.5 dB while the optical loss $\alpha c$ in the air gap between end faces of the graded-index, multimode light guides, idle and subject to study, was equal to 0.32 dB (double quantity: $2\alpha c=0.64$ dB), the value calculated by the relation (7).

What is claimed is:

1. A method of determining the optical loss in reflected radiation in a fibre-optic light guide under study having input and output end faces, with the use of an idle light guide having an output end face and connected through a splitter with a source and a transducer of radiation, said method comprising the steps of:

providing establishment of a stationary-mode distribution of radiation in forward and return paths thereof through said idle guide, and eliminating non-linearity of conversion by said transducer of the power of radiation reflected by said output end face of said idle guide;

introducing radiation from said source into said idle guide;

measuring by said transducer of the power $P_0$ of the radiation reflected by said output end face of said idle guide;

mating of said output end face of said idle guide with said input end face of said guide under study without an air gap at a joint therebetween, so as to obtain the maximum power of the radiation which has entered said guide under study from said idle guide and, after reflection from said output end face of the guide under study, has returned by the same path to said transducer, whereby reducing the optical loss due to double crossing said joint by the radiation to zero;

measuring said maximum radiation power $P_1$, and finding the optical loss in the guide under study from said $P_0$ and $P_1$ according to the relation $$A = \frac{P_o - P_1}{2} + lg(n_1 - 1) +$$

$$lg(n_o + 1) - lg(n_1 + 1) - lg(n_o - 1), \text{dBm}$$

where $A$ is the optical loss in said guide under study, dBm, $P_0$—the power of radiation reflected by said output end face of said idle guide, dBm, $P_1$—the maximum value of the power of radiation which has entered said guide under study from said idle guide and, after reflection from said output end face of the guide under study, has returned by the same path to said transducer, dBm, $n_0$—the relative refractive index of the material of said idle guide, and $n_1$—the relative refractive index of the material of said guide under study.

2. A method of determining the optical loss in reflected radiation in a fibre-optic light guide under study having input and output end faces, with the use of an idle light guide having an output end face and connected through a splitter with a source and transducer of radiation, said method comprising the steps of:

providing establishment of a stationary-mode distribution of radiation in forward and return paths thereof through said idle guide, and eliminating non-linearity of conversion by said transducer of the power of radiation reflected by said output end face of said idle guide;

introducing radiation from said source into said idle guide;

measuring by said transducer of the power $P_0$ of the radiation reflected by said output end face of said idle guide;

mating of said output end face of said idle guide with said input end face of said guide under study with an air gap at a joint therebetween, so as to obtain the maximum power of the radiation which has entered said guide under study from said idle guide and, after reflection from said output end face of the guide under study, has returned by the same path to said transducer, whereby reducing the optical loss due to double crossing said joint by the radiation to a predetermined value;

measuring said maximum radiation power $P_1$, and finding the optical loss in said guide under study from said $P_0$ and $P_1$ according to the relation $$A = \frac{P_o - P_1}{2} + lg\frac{4n_o n_1}{(n_o + n_1)(n_o n_1 + 1)} +$$

$$lg\frac{(n_1 - 1)(n_o + 1)}{(n_1 + 1)(n_o - 1)}, \text{dBm}$$

where $A$ is the optical loss in said guide under study, dBm, $P_0$ is the power of radiation reflected by said output end face of said idle guide, dBm, $P_1$ is the maximum value of power of the radiation which has entered said guide under study from said idle guide through said air gap and, after reflection from said output end face of said guide under study, has returned by the same path to said transducer, dBm, $n_0$ is the relative refractive index of the material of said idle guide, and $n_1$ is the relative refractive index of the material of said guide under study.

3. A method of determining the optical loss in reflected radiation in a fibre-optic light guide under study having input and output end faces, with the use of an idle light guide having an output end face and connected through a splitter with a source and a transducer of radiation, said method comprising the steps of:

providing establishment of a stationary-mode distribution of radiation in forward and return paths thereof through said idle guide, and eliminating non-linearity of conversion by said transducer of the power of radiation reflected by said output end face of said idle guide;

introducing radiation from said source into said idle guide;

measuring by said transducer of the power $P_0$ of the radiation reflected by said output end face of said idle guide;

mating of said output end face of said idle guide with said input end face of said guide under study so that the radiation from said idle guide may pass into said guide under study and back into said idle guide;

measuring the power $P_1$ of the radiation which has entered said guide under study from said idle guide and, after reflection from said output end face of said guide under study, has returned by the same path to said transducer;

measuring the powers $P_{01}$ and $P_{02}$ of the radiation which has entered said idle guide, has been scattered in a first and a second points of said idle guide and has returned by the same path to said transducer, said first and said second points of said idle guide being located at distances $l_{01}$ and $l_{02}$, respectively, from said radiation source, on which distances said stationary-mode distribution is established while the radiation passes from said source to these points and back to said transducer, measuring the powers $P_{11}$ and $P_{12}$ of the radiation which has entered said guide under study, has been scattered in a first and a second points of said guide under study located at distances $l_{11}$ and $l_{12}$, respectively, from said source, and has returned by the same path to said transducer, and finding the optical loss in said guide under study from the relation:

$$A = \frac{P_o - P_1}{2} + P_{02} - P_{11} - \frac{P_{o1} - P_{o2}}{l_{o2} - l_{o1}}(l - l_{o2}) -$$

$$\frac{P_{11} - P_{12}}{l_{12} - l_{11}}(l_{11} - l), \text{dBm}$$

where $A$ is the optical loss in said guide under study, dBm, $P_0$—the power of the radiation reflected by said output end face of said idle guide, dBm, $P_1$—the power of the radiation which has entered said guide under study from said idle guide and, after reflection from said output end face of said guide under study, has returned by the same path to said transducer of radiation, dBm, $P_{01}$—the power of the radiation which has entered said idle guide and has been scattered in said first point of said idle guide, dBm, $P_{02}$—the power of the radiation which has entered said idle guide and has been scattered in said second point of said idle guide, dBm, $P_{11}$—the power of the radiation which has entered said guide under study and has been scattered in said first point of said guide under study, dBm, $P_{12}$—the power of the radiation which has entered said guide under study and has been scattered in said second point of said guide under study, dBm, $l_{01}$—the distance from said radiation source to said first point of said idle guide, m, $l_{02}$—the distance from said radiation source to said second point of said idle guide, m, $l_{11}$—the distance from said radiation source to said first point of said guide under study, m, $l_{12}$—the distance from said radiation source to said second point of said guide under study, m, $l$—the distance from said radiation source to said output end face of said idle guide, m.

* * * * *